Patented Mar. 13, 1928.

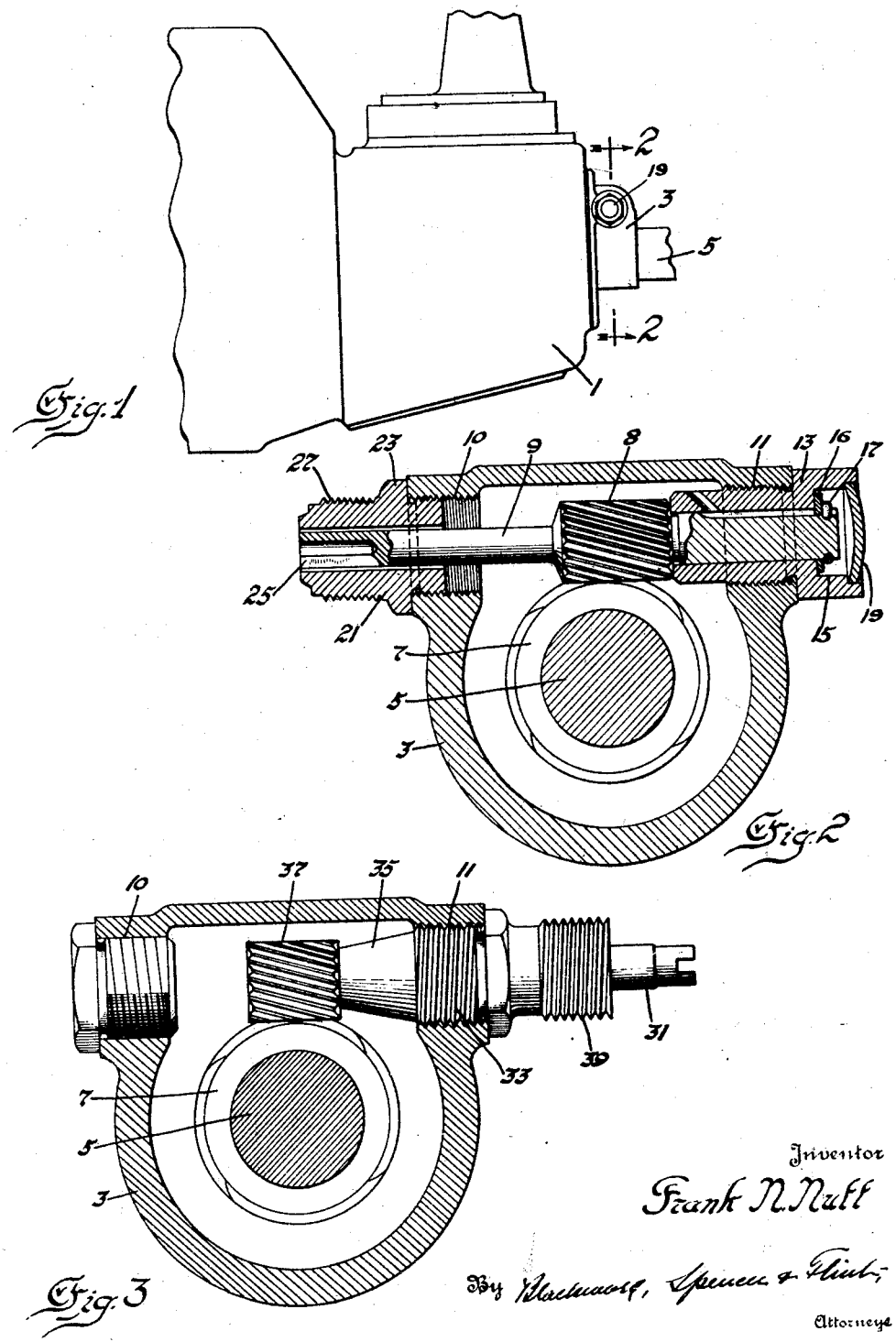

1,662,536

UNITED STATES PATENT OFFICE.

FRANK N. NUTT, OF FLINT, MICHIGAN, ASSIGNOR TO A C SPARK PLUG COMPANY, OF FLINT, MICHIGAN, A COMPANY OF MICHIGAN.

SPEEDOMETER DRIVE.

Application filed March 26, 1926. Serial No. 97,669.

This invention relates to driving means for operating a measuring instrument. In particular it is designed to drive a vehicle speedometer from a transmission shaft.

In motor vehicles it is well known to provide a transmission shaft with a gear driving a transverse shaft housed in the transmission casing, or in the supplementary housing secured thereto, the transverse shaft being connected by a flexible drive shaft to a conveniently located measuring instrument.

It is an object of this invention to provide a conveniently assembled equipment having a general purpose indicated above. My invention has the further object of permitting the driving connection to be made on either side of the transmission housing. It also permits the substitution of other speedometer driving equipments as well as that for which it is primarily intended.

In the drawing:

Figure 1 is a side elevation of a vehicle transmission housing including the power take off arrangement for the speedometer drive.

Figure 2 is a transverse section on the line 2—2 of Figure 1.

Figure 3 is a similar section showing a modified form of drive mechanism.

Referring by reference characters to the drawing, numeral 1 represents a conventional transmission housing at the rear of which is a housing 3, which may either be a part of the transmission housing 1 or a supplemental housing secured thereto. Extending from the transmission casing 1 and passing through the supplementary housing 3 is a transmission shaft 5. Secured to the shaft 5 within the housing 3 is a helical gear 7. This gear is in driving connection with a second driving gear 8 mounted on a transverse shaft 9. The transverse shaft 9 extends through aligned openings 10 and 11. Within the opening 11 is threaded a fixture 13 which is apertured and serves as a bearing for the end of shaft 9. Within the housing 3 the fixture 13 is extended to position the gear 8. Within an enlarged opening 15 in fixture 13 there is assembled on the shaft 9 a washer 16 and a key 17. To close the open end of fixture 13 there is employed a Welsh plug 19. Within the opening 10 there is threaded a sleeve 21 which has a flange 23 engaging the outer face of the housing 3. The shaft 9 extends through the sleeve 21 but is out of contact therewith. The end of shaft 9 within the sleeve 21 is provided with a suitable opening 25 for connection with the flexible speedometer shaft, not shown. The outside of sleeve 21 is threaded, as at 27, for connection with the flexible speedometer shaft casing.

It will be observed from the above description that inasmuch as the parts are symmetrically arranged, it is possible to reverse the sleeves 13 and 21 to thereby take the drive from the opposite side of the transmission housing. In assembling the device, the shaft 9 is first positioned in sleeve 13 and the securing means 16 and 17 are then placed in position. The plug 19 may then be inserted and the sleeve 13 screwed into its position.

The construction described above is intended particularly for the usual A C speedometer equipment. Should, however, the builder of the car prefer to use a different type of speedometer drive, the symmetrical relation of the parts makes it possible for him to do so.

In Figure 3 is shown one other type of driving connection, the Stewart Warner type. In this figure the transmission shaft 5 and gear 7 are used in the housing 3 as before. The speedometer driving shaft 31 passes through the sleeve 33, which is threaded into either of the threaded openings 10 or 11. This sleeve has an inward extension 35 positioning the helical gear 37 on the inner end of shaft 31. The outer end of the sleeve 33 has threads cut thereon as at 39 for connection with the casing of the flexible drive member.

From the above description it will be readily seen that it is possible to connect the speedometer drive at either side of the transmission. That it is also possible to use different types of driving mechanism.

I claim:

1. In means for driving a speedometer or the like, a housing having a transmission shaft extending therethrough, a driven shaft arranged transversely thereof and driven thereby, two aligned openings through which said shaft passes, two sleeves, one in each opening, one sleeve having an elongated bearing opening in which the transverse shaft is journalled, and the other sleeve having an opening through which the transverse shaft freely passes.

2. The combination set forth in claim 1, the first sleeve having an inward extension positioning the shaft gear and a plug closing its open end, the second sleeve being open throughout its length, and means on the end of said sleeve to couple the flexible drive shaft casing, the end of the transverse shaft carried by the open sleeve being provided with means for coupling the flexible driving shaft.

3. A drive for measuring instruments comprising a housing, transversely positioned shafts therein, inter-engaging gear elements on said shafts, the housing having aligned openings for the driven shaft, a plugged sleeve in one opening formed with an elongated bearing for said driven shaft, an open sleeve in the other housing opening, operative to receive the driving end of said driven shaft, the aperture being dimensioned so that the open sleeve is free from engagement with the driven shaft.

In testimony whereof I affix my signature.

FRANK N. NUTT.